US008650504B2

(12) United States Patent
Shimizu et al.

(10) Patent No.: US 8,650,504 B2
(45) Date of Patent: Feb. 11, 2014

(54) ORDER RECEIVING APPARATUS AND ORDER RECEIVING METHOD

(75) Inventors: Kenji Shimizu, Shizuoka (JP);
Masanori Sambe, Shizuoka (JP);
Takashi Makiyama, Tokyo (JP);
Yumiko Okuma, Tokyo (JP); Hisashi Sato, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 266 days.

(21) Appl. No.: 12/755,736

(22) Filed: Apr. 7, 2010

(65) Prior Publication Data

US 2010/0262936 A1 Oct. 14, 2010

(30) Foreign Application Priority Data

Apr. 8, 2009 (JP) ................................. 2009-094201

(51) Int. Cl.
*G06F 3/048* (2013.01)
(52) U.S. Cl.
USPC .............................. 715/810; 715/845; 705/16
(58) Field of Classification Search
USPC ..................................... 715/810, 845; 705/16
See application file for complete search history.

(56) References Cited

U.S. PATENT DOCUMENTS

| | | | | |
|---|---|---|---|---|
| 2001/0047302 A1* | 11/2001 | Yoshinaga et al. | ............... | 705/15 |
| 2002/0194074 A1* | 12/2002 | Jacobs | ............................ | 705/16 |
| 2006/0190806 A1* | 8/2006 | Sasson et al. | .................. | 715/500 |
| 2007/0265935 A1* | 11/2007 | Woycik et al. | ................... | 705/26 |
| 2010/0192090 A1 | 7/2010 | Hiramatsu et al. | | |

FOREIGN PATENT DOCUMENTS

| | | |
|---|---|---|
| JP | 05-197470 | 8/1993 |
| JP | H06-214710 | 8/1994 |
| JP | 2002-279042 | 9/2002 |
| JP | 2004-180275 | 6/2004 |
| JP | 2004-348085 | 12/2004 |
| JP | 2005-072922 | 3/2005 |
| JP | 2005-234782 | 9/2005 |
| JP | 2006-163938 | 6/2006 |
| JP | 2007-226299 | 9/2007 |
| JP | 2007-264702 | 10/2007 |
| JP | 2008-284263 | 11/2008 |
| JP | 2008-299821 | 12/2008 |
| JP | 2009-42871 | 2/2009 |

OTHER PUBLICATIONS

Japanese Office Action for Japanese Patent Application No. 2009-094201 mailed on Jul. 19, 2011.

(Continued)

*Primary Examiner* — Andrea Leggett
(74) *Attorney, Agent, or Firm* — Turocy & Watson, LLP

(57) ABSTRACT

An order receiving apparatus includes: a display unit configured to display an order input screen including a menu item space in which operation images for receiving orders of menu items are allocated and a menu allocation screen including the menu item space and a list of menu items for which the operation images can be allocated to the menu item space; a first selecting unit configured to select a menu item from among the menu items included in the list; a second selecting unit configured to select an allocation position to which the selected operation image of is allocated in the menu item space; and an updating unit configured to update the definition information according to the selected menu item and the selected allocation position.

12 Claims, 7 Drawing Sheets

(56) References Cited

OTHER PUBLICATIONS

Japanese Office Action for Japanese Patent Application No. 2009-094201 mailed on Nov. 16, 2010.
English Translation of Office Action of Notice of Rejection for Japanese Patent Application No. 2011-228219 Dated Mar. 5, 2013, 5 pgs.
"Java wo manabu itsutsu no pointo (Five points for learning Java)", Nikkei Software, vol. 4, June issue, Japan, Nikkei Business Publications, Inc., May 24, 2001, vol. 4, pp. 42 to 51.
Japanese Office Action for Japanese Patent Application No. 2011-007136 mailed on Feb. 26, 2013, 2 pages.

\* cited by examiner

FIG.4

| CODE | SECTION | ALLOCATION | IMAGE | MENU MANE | UNIT PRICE | TAKE AWAY | SERVICE CHARGE IMPOSED | KP1 TO 4 | BUTTON COLOR |
|---|---|---|---|---|---|---|---|---|---|
| 0001 | 01 | 1 | | BLENDED COFFEE | 350 | OK | ○ | | |
| 0002 | 01 | 2 | | ICED COFFEE | 350 | OK | ○ | | |
| 0003 | 01 | 3 | | WEAK COFFEE L | 350 | OK | | | |
| 0004 | 01 | 4 | | ESPRESSO | 500 | OK | ○ | | |
| 0005 | 01 | 5 | | COFFEE OF THE DAY | 300 | OK | ○ | | |
| 0006 | 01 | | | CAFÉ LA THE | 420 | OK | | | |
| 0007 | 01 | | | CAFÉ LA THE L | 460 | OK | ○ | | |
| 0008 | 01 | | | TEA WITH LEMON | 350 | OK | ○ | | |
| 0009 | 01 | | | TEA WITH MILK | 350 | OK | ○ | | |
| 0010 | 01 | | | HERB TEA | 300 | | | | |
| 0011 | 01 | | | OOLONG TEA | 250 | | | | |
| 0012 | 01 | | | COKE | 250 | | | | |
| 0013 | 01 | | | GINGER ALE | 250 | | | | |

FIG.6

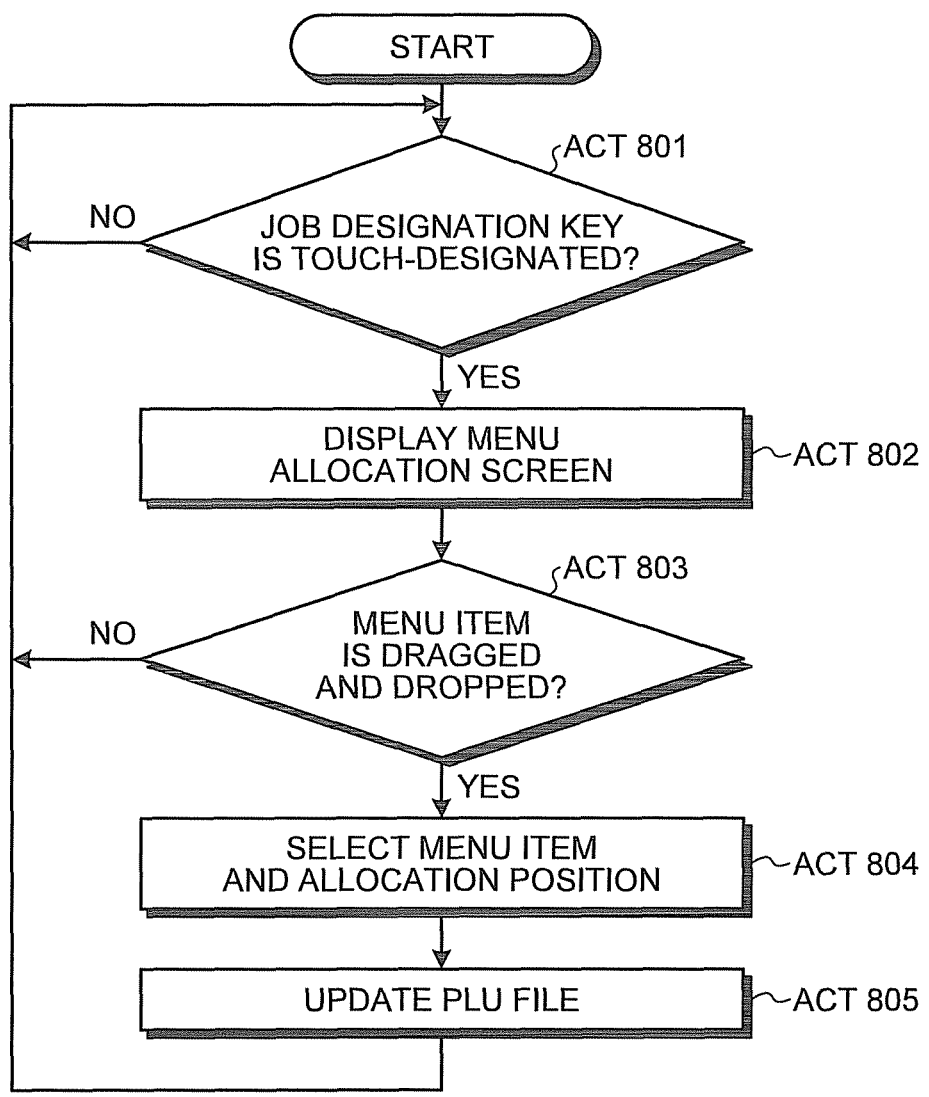

ORDER RECEIVING APPARATUS AND ORDER RECEIVING METHOD

CROSS-REFERENCE TO RELATED APPLICATION

This application claims the benefit of priority from Japanese Patent Application No. 2009-094201 filed on Apr. 8, 2009, the entire content of which is incorporated herein by reference.

TECHNICAL FIELD

The present invention relates to an order receiving apparatus set in an eating house such as a restaurant and an order receiving method for inputting guidance information for customers, order information of menus, and the like and supporting customer service jobs.

BACKGROUND

For example, in a large number of eating houses such as family restaurants and bars, an order management system that can centrally manage jobs from order taking to checkout of food and drink menus is installed (see JP-A-2008-299821). The system disclosed in JP-A-2008-299821 includes a checkout apparatus such as an electronic cash register or a point of sales (POS) terminal set in a register that is a checkout place for payment, a station configured to execute, for example, management of various kinds of information transmitted from the checkout apparatus, a slip issuing printer connected to the checkout apparatus and configured to print and issue an order slip, and a kitchen printer configured to print and output a cooking instruction slip. In the system disclosed in JP-A-2008-299821, the station, the slip issuing printer, the kitchen printer, and the checkout apparatus are connected via a communication line such as a local area network (LAN).

However, with the checkout apparatus disclosed in JP-A-2008-299821, in updating menu buttons displayed in a menu item space of an order input screen, an operator has to update the menu buttons on another screen different from the order input screen. Therefore, after updating the menu buttons, the operator cannot check whether the menu buttons are updated as imaged by the operator unless the operator looks at the menu item space of the order input screen. This makes operability extremely low for the operator, resulting in a burden on the operator.

SUMMARY

According to an aspect of the invention, there is provided an order receiving apparatus including: a display unit configured to display an order input screen including a menu item space in which operation images for receiving orders of menu items are allocated according to definition information for defining the operation images and a menu allocation screen including the menu item space and a list of menu items for which the operation images can be allocated to the menu item space; a first selecting unit configured to select a menu item for which the operation image is allocated to the menu item space among the menu items included in the list; a second selecting unit configured to select an allocation position to which the operation image of the menu item selected by the first selecting unit is allocated among allocation positions to which the operation images can be allocated in the menu item space; and an updating unit configured to update the definition information according to the menu item selected by the first selecting unit and the allocation position selected by the second selecting unit.

According to another aspect of the invention, there is provided an order receiving method including: displaying an order input screen including a menu item space in which operation images for receiving orders of menu items are allocated according to definition information for defining the operation images and a menu allocation screen including the menu item space and a list of menu items for which the operation images can be allocated to the menu item space; selecting a menu item for which the operation image is allocated to the menu item space among the menu items included in the list; selecting an allocation position to which the operation image of the selected menu item is allocated among allocation positions to which the operation images can be allocated in the menu item space; and updating the definition information according to the selected menu item and the selected allocation position.

DESCRIPTION OF THE DRAWINGS

FIG. 4 is a schematic diagram of a file structure of a PLU file accessible by the information terminal and the station;

FIG. 6 is a diagram of an example of an order input screen;

FIG. 8 is a flowchart for explaining a flow of processing for updating the PLU file.

DETAILED DESCRIPTION

An embodiment of the invention is explained below with reference to FIGS. 1 to 8. This embodiment is an example in which an order receiving apparatus and an order receiving method are applied to an information terminal of a customer service supporting system for supporting customer service jobs in an overall flow of customer services for guiding a customer who visits a restaurant to a table set in a customer service floor, taking an order, and serving the customer with food. The customer supporting system according to this embodiment includes information terminals set in the customer service floor and a checkout counter and a station as a server set in a backyard or the like of the restaurant and configured to control the overall customer supporting system.

Figure 1:
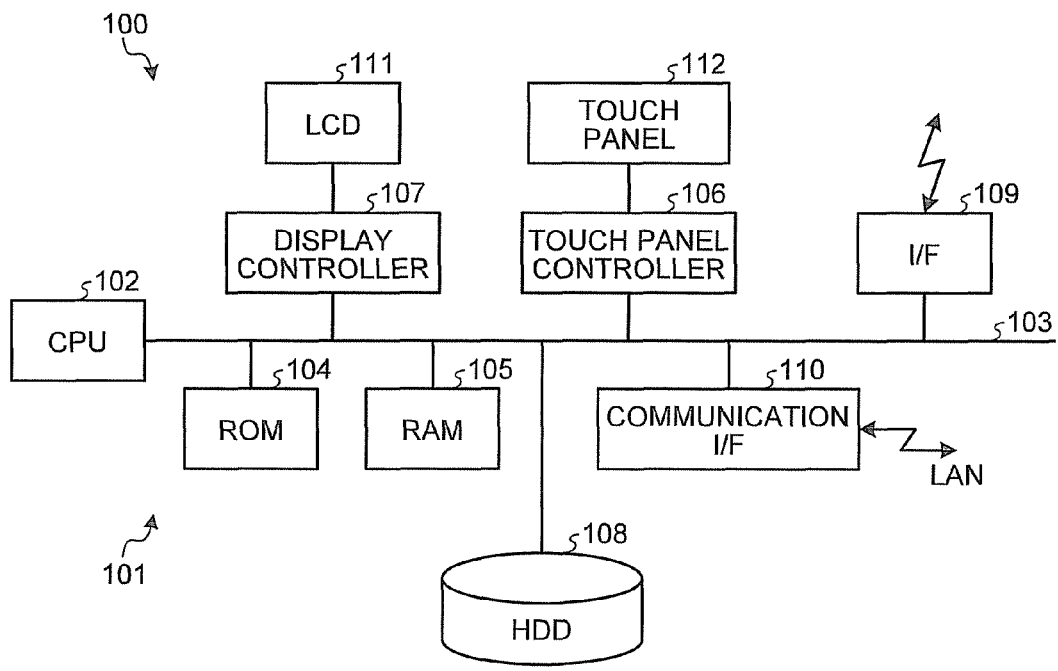
FIG. 1 is a block diagram of electric connection of an information terminal.

FIG. 1 is a block diagram of electric connection of an information terminal. As shown in FIG. 1, an information terminal 100 includes a microcomputer 101. The microcomputer 101 controls to drive units of the information terminal 100. In the microcomputer 101, a read only memory (ROM) 104 having stored therein fixed information such as a control program in advance and a random access memory (RAM) 105 configured to rewritably store various kinds of information and function as a work area or the like are connected to, via a bus line 103, a central processing unit (CPU) 102 configured to centrally control the units. Therefore, the microcomputer 101 configures an information processing unit configured to execute information processing.

In the information terminal 100, a touch panel controller 106, a display controller 107, a hard disk drive (HDD) 108, an interface 109, and a communication interface 110 are connected to the microcomputer 101 via the bus line 103. The touch panel controller 106 captures an input signal from a touch panel 112 into the microcomputer 101. The display controller 107 controls to drive a liquid crystal display (LCD) 111 on the basis of image data to display an image corresponding to image data on the liquid crystal display 111. The interface 109 is an interface such as a universal serial bus (USE) for connecting a printer, a customer side display device, and the like, which are not shown in the figure, to the microcomputer 101. The communication interface 110 is an interface for causing the microcomputer 101 to perform data communication with other apparatuses via a local area network (LAN).

In the information terminal 100, an operating system (OS), a computer program, various files, and the like are installed in the HDD 108. When the information terminal 100 is started, the microcomputer 101 copies all or a part of the OS, the computer program, the various files, and the like installed in the HDD 108 to the RAM 105. The CPU 102 accesses the various files and the like copied to the RAM 105. The CPU 102 operates according to the OS and the computer program copied to the RAM 105.

Figure 2:
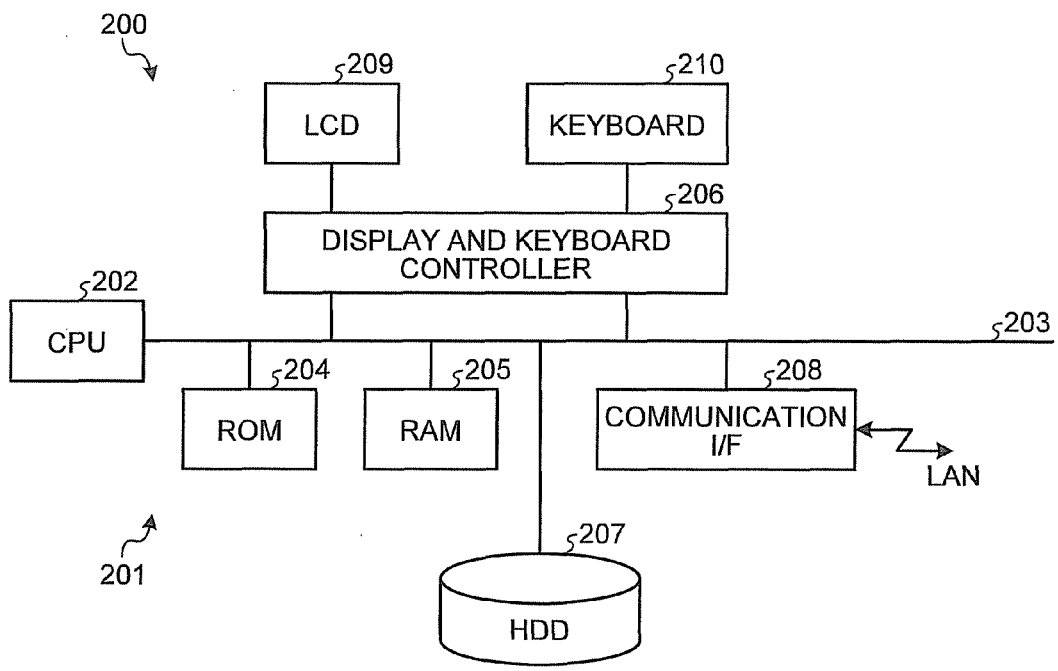
FIG. 2 is a block diagram of electric connection of a station.

FIG. 2 is a block diagram of electric connection of a station. As shown in FIG. 2, a station 200 includes a microcomputer 201. The microcomputer 201 controls to drive units of the station 200. In the microcomputer 201, a ROM 204 having stored therein fixed information such as a control program in advance and a RAM 205 configured to rewritably store various kinds of information and function as a work area or the like are connected to, via a bus line 203, a CPU 202 configured to centrally control the units. Therefore, the microcomputer 201 configures an information processing unit configured to execute information processing.

In the station 200, a display and keyboard controller 206, a HDD 207, and a communication interface 208 are connected to the microcomputer 201 via the bus line 203. The display and keyboard controller 206 controls to drive a liquid crystal display (LCD) 209 on the basis of image data to display an image corresponding to the image data on the liquid crystal display 209. The display and keyboard controller 206 captures an input signal from a keyboard 210 into the microcomputer 201. The communication interface 208 is an interface for causing the microcomputer 201 to perform data communication with other apparatuses through the LAN.

In the station 200, an OS, a computer program, various files, and the like are installed in the HDD 207. The microcomputer 201 copies all or a part of the OS, the computer program, the various files, and the like installed in the HDD 207 to the RAM 205. The CPU 202 operates according to the OS and the computer program copied to the RAM 205.

Figure 3:
FIG. 3 is a schematic diagram of a file structure of a section file accessible by the information terminal and the station.

FIG. 3 is a schematic diagram of a file structure of a section file accessible by the information terminal and the station. In the information terminal 100 and the station 200, a section file 301 is installed in the HDD 108 of the information terminal 100 and the HDD 207 of the station 200. The station 200 downloads the section file 301 installed in the HDD 207 of the station 200 to the HDD 108 of the information terminal 100, for example, during record update of the section file 301 or at night after the closing time such that a discrepancy does not occur between the section file 301 installed in the HDD 108 and the section file 301 installed in the HDD 207.

In the section file 301, a section 301b, a tag position 301c, and remarks 301d are registered in association with a two-digit section number 301a. As an example, as the section number 301a, the following numbers are associated with sections:
 01: drink
 02: dessert
 03: wazen
 04: wayosyoku
 05: donmono
 06: nabemono
 07: udon and soba
 08: ipinryouri
 09: kensai and salad In the section file 301, section names of sections are registered in the section 301b. In the section file 301, the arrangement of sections in a section tag D11 (see FIG. 6) displayed on an order input screen D is registered in the tag position 301c. The remarks 301d column is a column in which various kinds of information can be written for, for example, information management.

FIG. 4 is a schematic diagram of a file structure of a PLU file accessible by the information terminal and the station. In the information terminal 100 and the station 200, a price look up (PLU) file 401 is installed in the HDD 108 of the information terminal 100 and the HDD 207 of the station 200. The station 200 downloads the PLU file 401 installed in the HDD 207 of the station 200 to the HDD 108 of the information terminal 100, for example, during record update of the PLU file 401 or at night after the closing time such that a discrepancy does not occur between the PLU file 401 installed in the HDD 108 and the PLU file 401 installed in the HDD 207.

In the PLU file 401, definition information for defining menu buttons D12a (see FIG. 6) displayed in a menu item space D12, which are operation images for receiving orders of menu items, such as a section 401b, an image link 401c, a menu name 401d, a unit price 401e, allocation 401f, and the like are registered in association with a code 401a. The code 401a is represented in four digits. The section 401b represents sections registered in the section 301b in the section file 301. The image link 401c defines link to image data displayed on the menu buttons D12a (see FIG. 6) in the menu item space D12. In the information terminal 100 and the station 200, image data displayed on the menu buttons D12a (see FIG. 6) is installed in the HDD 108 of the information terminal 100 and the HDD 207 of the station 200. The menu name 401d defines item names of menu items defined by the code 401a. The unit price 401e defines unit prices of the menu items defined by the code 401a. The allocation 401f defines allocation positions of the menu buttons D12a (see FIG. 6) in the menu item space D12 defined by the code 401a. In the information terminal 100 and the station 200, menu items of the section 401b defined by the code 401a, allocation positions of which are not defined in the allocation 401f, are not displayed on the menu buttons D12a (see FIG. 6) in the menu item space D12.

For example, as it is seen when FIGS. 3 and 4 are referred to, a code "0001" defines "blended coffee" of a section "drink". The unit price 401e defines a unit price "¥350". A code "0002" defines "iced coffee" of the section "drink". The unit price 401e defines the unit price "¥350".

Characteristic processing of the information terminal 100 according to this embodiment among kinds of processing executed by the microcomputer 101 according to the OS and the computer program installed in the HDD 108 of the information terminal 100 is explained below.

Figure 5:
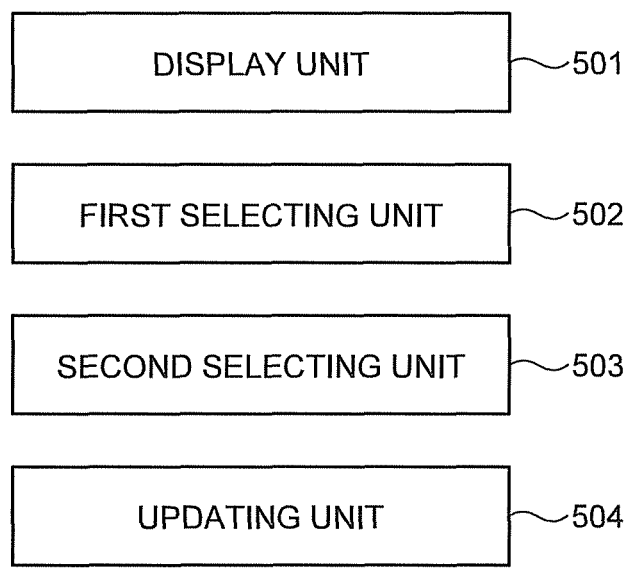
FIG. 5 is a block diagram of a module configuration of an information terminal according to an embodiment of the invention.

The computer program executed by the information terminal 100 according to this embodiment has a module configuration including units (a display unit 501, a first selecting unit 502, a second selecting unit 503, and an updating unit 504) shown in FIG. 5. As actual hardware, the CPU 102 of the microcomputer 101 reads out the computer program from the HDD 108 and executes the computer program, whereby the units are loaded onto the RAM 105 and the display unit 501, the first selecting unit 502, the second selecting unit 503, and the updating unit 504 are generated on the RAM 105. FIG. 5 is a block diagram of a module configuration of the information terminal according to this embodiment.

Figure 6:
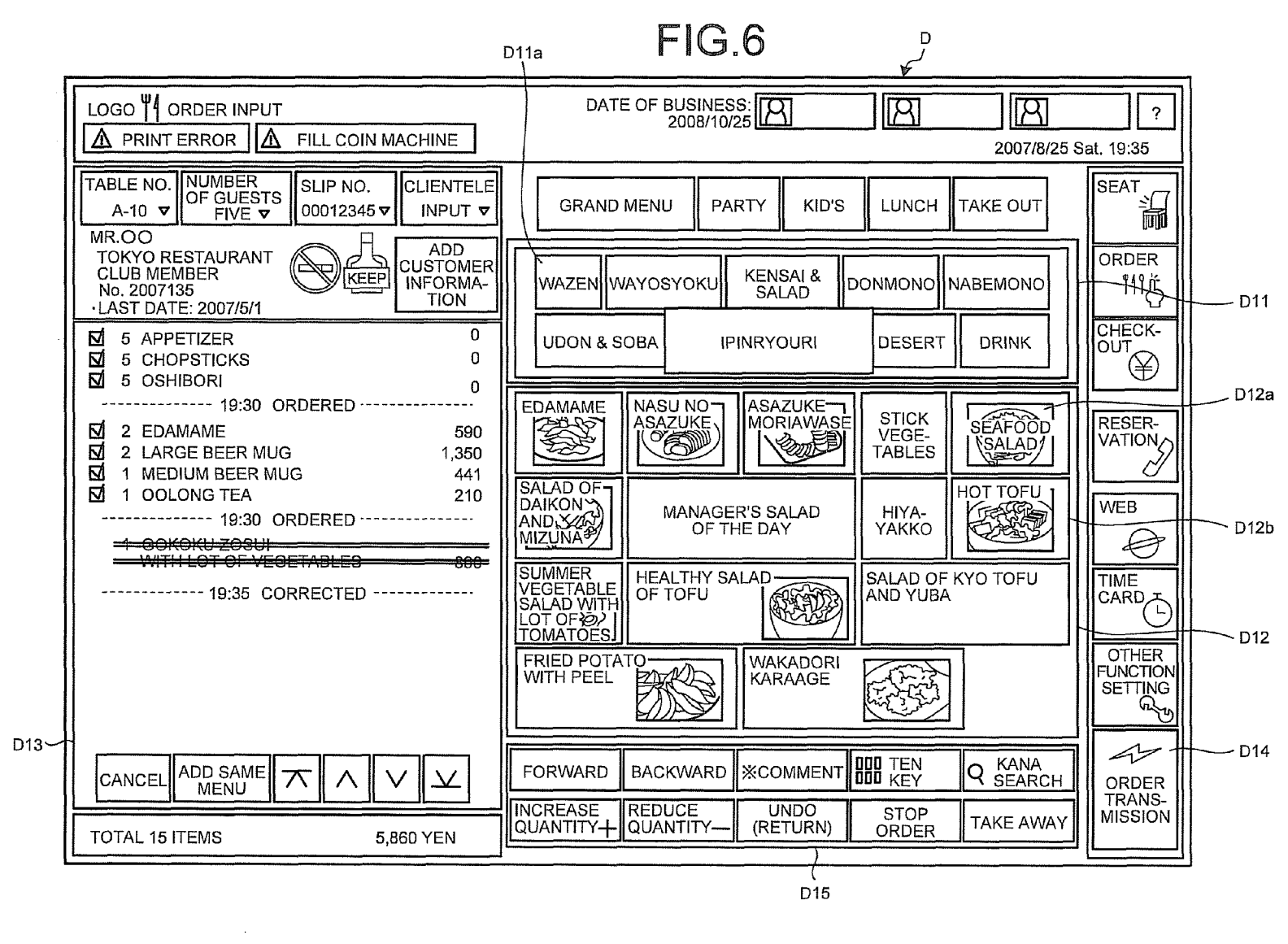

The display unit 501 displays an order input screen D shown in FIG. 6 on the liquid crystal display 111. FIG. 6 is a diagram of an example of an order input screen. The display unit 501 displays the order input screen D including the section tag D11, the menu item space D12, an order list D13, a job designation key D14, and a function key D15.

The display unit 501 displays section buttons D11a, on which section names defined in the section 301b are displayed, in the section tag D11 as objects, which can be touch-designated on the touch panel 112, in association with the section number 301a of the section file 301.

In an initial state, the display unit 501 displays, for each of sections, the section buttons D11a of which are touch-designated, the menu buttons D12a, which are allocated according to the definition information such as the section 401b, the image link 401c, the menu name 401d, the unit price 401e, and the allocation 401f defined in association with the code 401a of the PLU file 401, in the menu item space D12 as objects that can be touch-designated by the touch panel 112. The menu buttons D12a are operation images for receiving orders of menu items and are buttons on which the image data as link destinations defined by the image link 401c and the item names defined by the menu name 401d are displayed in allocation positions D12b to which the menu buttons D12a defined by the allocation 401f can be allocated.

The display unit 501 displays, as a list, menu items touch-designated on the order input screen D by the touch panel 112, the numbers of orders, and amounts (unit prices×the numbers of orders) on the order list D13.

The display unit 501 displays keys for designating execution of various jobs such as "checkout" related to execution of checkout processing, "order transmission" related to execution of order transmission, and "other function setting" related to execution of processing for updating the PLU file 401 on the job designation key D14 as objects that can be touch-designated on the touch panel 112.

The display unit 501 displays keys for designating execution of various functions such as "increase quantity" related to execution of processing for increasing the number of orders and "reduce quantity" related to execution of processing for reducing the number of orders on the function key D15 as objects that can be touch-designated on the touch panel 112.

A user can select, in inputting a menu item, a desired section out of "drink", "dessert", "wazen", "wayosyoku", "donmono", "nabemono", "udon & soba", "ipinryouri", and "kensai and salad" by touch-designating a desired section button D11a of the section tag D11 on the order input screen D. For example, the display unit 501 displays the order input screen D for "ipinryouri" illustrated in FIG. 6 when the section button D11a of "ipinryouri" in the section tag D11 is touch-designated.

Figure 7:
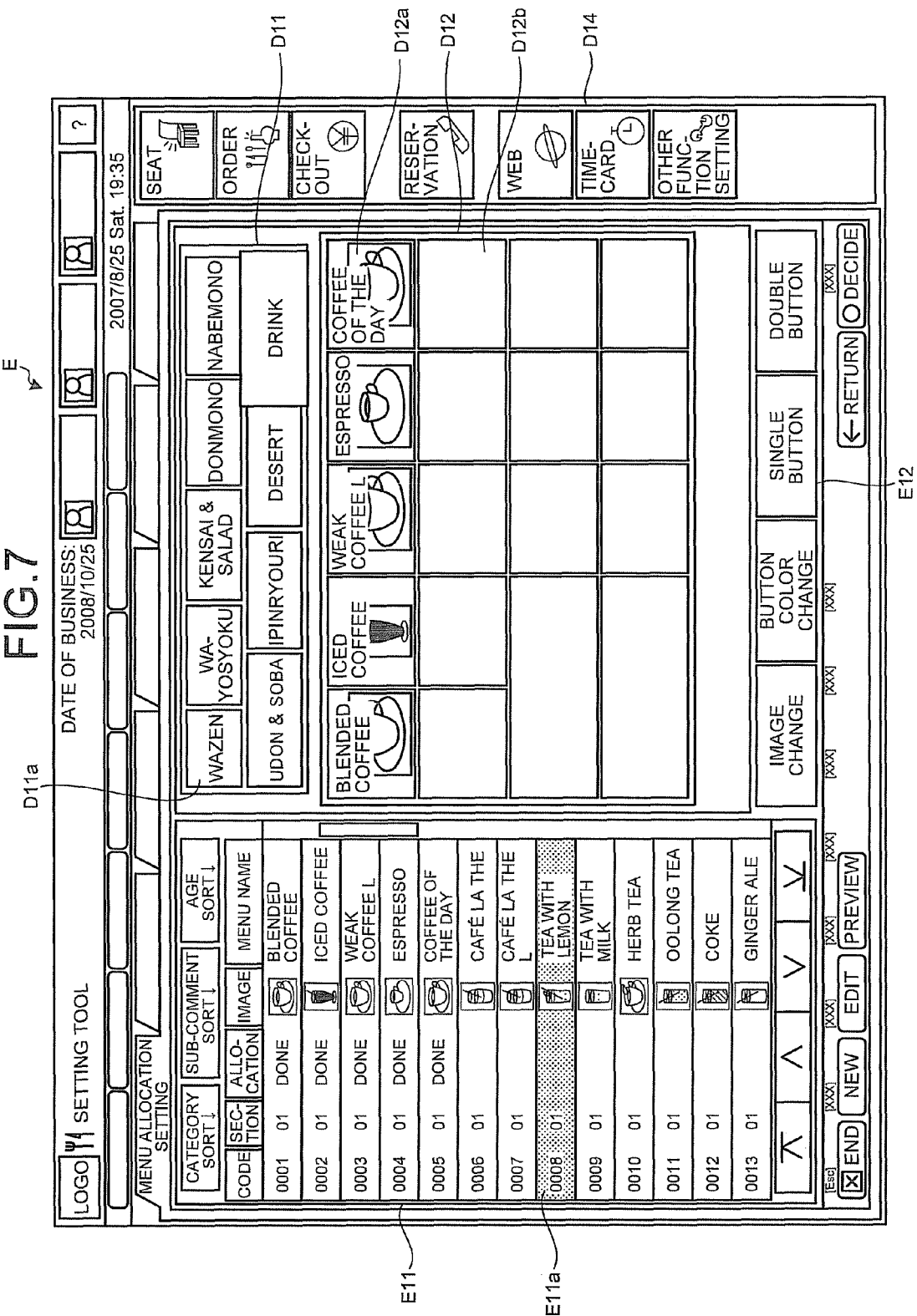
FIG. 7 is a diagram of an example of a menu allocation screen.

The display unit 501 displays a menu allocation screen E shown in FIG. 7 on the liquid crystal display 111 when "other function setting" of the job designation key D14 is touch-designated. FIG. 7 is a diagram of an example of a menu allocation screen. The display unit 501 displays the menu allocation screen E including the section tag D11, the menu item space D12, a list E11, and function keys E12. Since the section tag D11 and the menu item space D12 are the same as those displayed on the order input screen D, explanation of the section tag D11 and the menu item space D12 is omitted.

The display unit 501 displays, for each of sections, section buttons D11a of which are touch-designated, as objects that can be touch-designated by the touch panel 112, the list E11 including menu items E11a, for which the menu buttons D12a can be allocated to the menu item space D12, such as the code 401a and the section 401b, the image link 401c, the menu name 401d, and the allocation 401f defined in association with the code 401a of the PLU file 401. In this embodiment, the display unit 501 displays, in the allocation 401f displayed in the list E11, "done" indicating that the menu buttons D12a are allocated to the menu item space D12. However, the display unit 501 may display numbers indicating allocation positions registered in the allocation 401f of the PLU file 401.

The display unit 501 displays, on the function keys E12, as objects that can be touch-designated on the touch panel 112, operation images for receiving switching of the size of the allocation positions D12b in the menu item space D12. The operation images are button for designating execution of various functions such as a "single button" for receiving switching to default size, a "double button" for receiving switching to size twice as large as the single button, and "image change" for changing images displayed on the menu buttons D12 from the image data at the link destinations defined by the image link 401c to other image data.

The first selecting unit 502 selects, among the menu items E11a included in the list E11, the menu item E11a dragged by touch-designation on the touch panel 112 as the menu item E11a, for which the menu button D12a is displayed in the menu item space D12.

The second selecting unit 503 selects, among the allocation positions D12b to which the menu buttons D12a can be allocated in the menu item space D12, a position where the menu item E11a is dropped by touch-designation on the touch panel 112 as the allocation position D12b of the menu button D12a of the dragged menu item E11a.

The updating unit 504 updates, according to the menu item E11a selected by the first selecting unit 502 and the allocation position D12b selected by the second selecting unit 503, the definition information (the allocation 401f) registered in the PLU file 401 installed in the HDD 108. Specifically, when the menu item E11a selected by the first selecting unit 502 is "tea with lemon" and the allocation position D12b selected by the second selecting unit 503 is "7", the updating unit 504 updates the allocation 401f registered in association with the code 401a ("0008") in the FLU file 401 to "7".

The updating unit 504 updates, according to touch-designation of the "single button" or the "double button" of the function keys E12, the definition information registered in the PLU file 401, which is definition information (not shown) in which the size of the menu buttons D12a displayed in the menu item space D12 is registered. In this embodiment, the updating unit 504 updates, according to touch-designation of the "single button" or the "double button" of the function keys E12, the definition information in which the size of the menu buttons D12a is registered. However, the updating unit 504 does not always update the definition information according to the touch designation of the function keys E12. For example, the updating unit 504 may update, according to the number of times of order of the menu item E11a selected by the first selecting unit 502, the definition information in which the size of the menu buttons D12a is registered. Consequently, since it is easy to operate the menu buttons D12a of the menu items E11a that are ordered many times, operability is high for the operator and a burden on the operator can be reduced. Further, since the menu buttons D12a of the menu items E11a that are ordered many times are touch-designated many times, it is likely that the touch panel 112 is deteriorated faster than usual in portions where the menu buttons D12a are displayed. However, it is possible to prevent touch-designated places from concentrating on one place by increasing the size of the menu buttons D12a of the menu items E11a that are ordered many times. Therefore, it is possible to slow down the deterioration in the touch panel 112.

The updating unit 504 can also change, according to touch-designation of the "image change" of the function keys E12, image data to be displayed on the menu buttons D12a of the menu item space D12 to image data stored in the HDD 108 or the like in advance.

The processing for updating the PLU file 401 is explained with reference to FIG. 8. FIG. 8 is a flowchart for explaining a flow of processing for updating a PLU file. In updating the PLU file 401, the display unit 501 waits for the "other function setting" of the job designation key D14 to be touch-designated (No in Act 801). If the "other function setting" of the job designation key D14 is touch-designated (Yes in Act 801), the display unit 501 displays the menu allocation screen E on the liquid crystal display 111 (Act 802).

Subsequently, if the menu item E11a included in the list E11 of the menu allocation screen E is dragged and dropped (Yes in Act 803), the first selecting unit 502 and the second selecting unit 503 respectively select the menu item E11a, for which the menu button D12a is displayed in the menu item space D12, and the allocation position D12b of the menu button D12a of the menu item E11a (Act 804). The updating unit 504 updates, on the basis of the selected menu item E11a and the selected allocation position D12b, a record of the definition information defined in the PLU file 401 installed in the HDD 108 (Act 805).

As explained above, according to this embodiment, the menu allocation screen E including the list E11 and the menu item space D12 is displayed on the liquid crystal display 111. When the menu item E11a displayed in the list E11 is dragged and dropped, the menu item E11a, for which the menu button D12a is displayed in the menu item space D12, and the allocation position D12b of the menu button D12a of the menu item E11a are selected. The PLU file 401 is updated on the basis of the selection of the menu item E11a and the allocation position D12b. This makes it possible to execute the processing for updating the PLU file 401 while looking at the menu item space D12 displayed on the order input screen D. Therefore, operability is high for the operator and a burden on the operator can be reduced.

Further effects and modifications can be easily derived by those skilled in the art. Therefore, a wider aspect of the invention is not limited by the specific details and the representative embodiment represented and described above. Therefore, various modifications are possible without departing from the spirit or the scope of the general concept of the invention defined by the appended claims and their equivalents.

What is claimed is:

1. An order receiving apparatus comprising:
   a display unit comprising at least one processor and configured to display an order input screen including a menu item space in which operation images configured to receive order input representing orders of menu items are allocated according to definition information for defining the operation images, and to display, in response to selection of a designated key on the order input screen, a list of menu items for which the operation images can be allocated to the menu item space, wherein selection of the designated key causes the list of menu items to be displayed simultaneously with the menu item space on a common display screen;
   a first selecting unit configured to select a menu item, of the list of menu items, for which an operation image, of the operation images, is to be allocated to the menu item space;
   a second selecting unit configured to select an allocation position within the menu item space to which the operation image of the menu item selected by the first selecting unit is to be allocated; and
   an updating unit configured to update the definition information according to the menu item selected by the first selecting unit and the allocation position selected by the second selecting unit.

2. The apparatus according to claim 1, wherein the display unit is further configured to display the list of menu items for respective sections of the menu items and the menu item space for the respective sections, wherein menu items of a given section of the respective selections are displayed in the list of menu items.

3. The apparatus according to claim 1, wherein
   the display unit is further configured to display operation images for receiving instructions for switching of size of the allocation positions, and
   the updating unit is further configured to update the definition information according to operation of the operation images for receiving the instructions for switching of the size of the allocation positions.

4. The apparatus according to claim 3,
   further comprising displaying a key for receiving instructions for switching of size of a menu button defined by the definition information,
   wherein the key, the menu item space, and the list of menu items are displayed simultaneously on the common display screen.

5. The apparatus according to claim 1, wherein the updating unit is further configured to update the definition information according to a number of times of order of the menu item selected by the first selecting unit.

6. The apparatus according to claim 1, wherein the operation images are buttons on which image data and menu names of the menu items are displayed.

7. The apparatus according to claim 1, wherein the display unit is further configured to display the order input screen on a liquid crystal display in which a touch panel is laminated and arranged on a display surface as an input device.

8. The apparatus according to claim 1, wherein
   in response to one of the menu items included in the list of menu items of the menu allocation screen being dragged and dropped to a position within the menu item space, the first selecting unit selects the one of the menu items as the menu item for which the operation image, of the operation image, is to be allocated to the menu item space, and the second selecting unit selects the position as the allocation position within the menu item space to which the operation image of the menu item is to be allocated, and
   the updating unit updates, based on the one of the menu items and the position, a record of the definition information.

9. An order receiving method comprising:
   displaying an order input screen including a menu item space in which operation images configured to receive order input representing orders of menu items are allocated according to definition information for defining the operation images;

displaying, in response to selection of a designated key on the order input screen, a list of menu items for which the operation images are able to be allocated to the menu item space, including displaying the list of menu items simultaneously with the menu item space on a common display screen;

selecting a menu item, of the list of menu items, for which an operation image, of the operation images, is to be allocated to the menu item space;

selecting an allocation position within the menu item space to which the operation image of the menu item is to be allocated; and updating the definition information according to selection of the menu item and the allocation position.

10. The method according to claim 9, further comprising displaying the list of menu items for respective sections of the menu items and a menu item space for the respective sections, wherein the menu items of the respective sections are displayed in the list of menu items.

11. The method according to claim 9, further comprising:
displaying operation images for receiving instructions for switching of size of the allocation positions; and
updating the definition information according to operation of the operation images for receiving instructions for switching of size of the allocation positions.

12. The method according to claim 9, further comprising updating the definition information according to a number of times of order of the menu item.

* * * * *